March 31, 1925.
L. C. NOTBOHM
ATTACHMENT FOR CORN PLANTERS
Filed Sept. 7, 1923
1,532,065
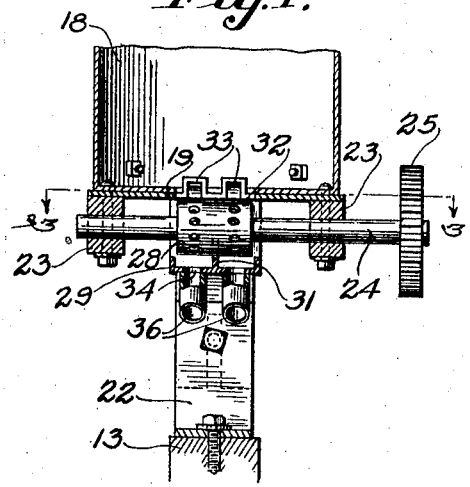
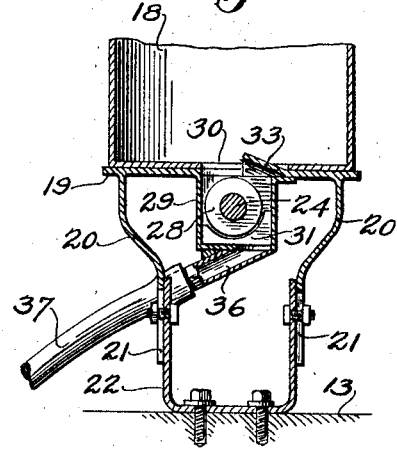
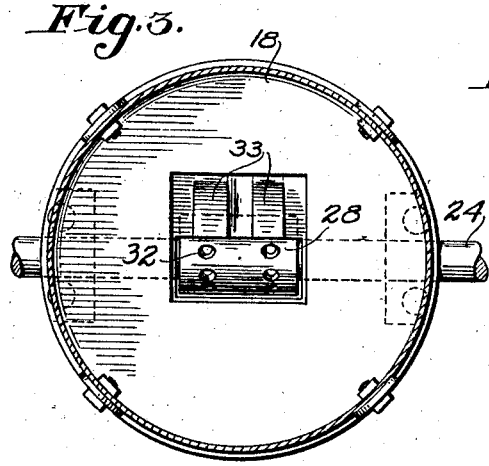
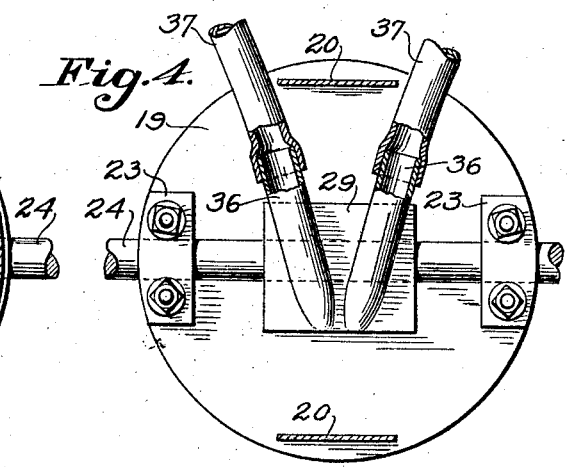
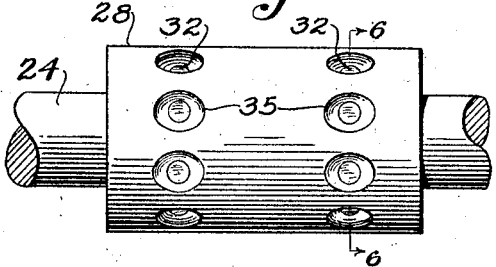
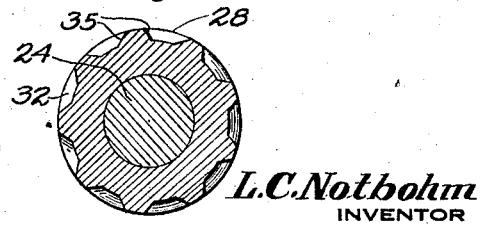
L.C. Notbohm
INVENTOR
WITNESSES
Louis Goodman
E. N. Lovewell
BY
ATTORNEY Patented Mar. 31, 1925.

1,532,065

UNITED STATES PATENT OFFICE.

LEONARD C. NOTBOHM, OF ROME, WISCONSIN.

ATTACHMENT FOR CORN PLANTERS.

Application filed September 7, 1923. Serial No. 661,415.

*To all whom it may concern:*

Be it known that I, LEONARD C. NOTBOHM, a citizen of the United States, residing at Rome, in the county of Jefferson and State of Wisconsin, have invented a new and useful Attachment for Corn Planters, of which the following is a specification.

This invention relates to an attachment for corn planters, by means of which a measured quantity of other seed, as for example soy beans, may be planted along with the corn.

The general object of the invention is to provide an attachment for the purpose stated, which is simple and inexpensive, and which may be readily attached in operative relation to any type of corn planter, without any modification in the structure of the latter.

The preferred form of the invention is illustrated in the accompanying drawings, in which, Figure 1 is a vertical sectional view through the auxiliary seed receptacle and discharge mechanism.

Figure 2 is a vertical sectional view taken at right angles to the plane of Figure 1.

Figure 3 is a horizontal sectional view on the line 3—3 of Figure 1.

Figure 4 is a bottom plan view of the auxiliary seed receptacle, with parts broken away.

Figure 5 is a detail view of the feed roll.

Figure 6 is a sectional view on the line 6—6 of Figure 5.

The auxiliary seed receptacle 18, which may contain soy beans, pumpkin seed, or any other seed which it may be desired to plant with the corn, is secured to a supporting bracket 19 provided with depending arms 20, which are formed with slots 21 at their lower ends, or with any other suitable means by which they may be supported for vertical adjustment on a yoke 22 secured to the tongue 13, or any other suitable part of the planter frame. Suitable bearings 23 are also secured to the bracket 19, and rotatably support a feed roll shaft 24 adapted to be driven by any suitable means, as for example, a sprocket wheel 25, connected to suitable gearing on the feed shaft of the planter.

The mechanism for feeding the seed from the receptacle 18 includes a feed roll 28 secured to the shaft 24 underneath the receptacle, and surrounded by a housing 29 secured to or forming a part of the bracket 19. A suitable opening 30 is formed in the bottom of the receptacle 18, through which the seed is dropped into contact with the roll 28. The roll is located directly below said opening and substantially closes the same.

Provision is also made for separating the seed into two streams.

For this purpose the housing is divided into two compartments by a flange 31, and the roll 28 is provided with two spaced series of substantially elliptical shaped circumferential cups or recesses 32, which travel underneath guiding flanges 33, through which the seeds are fed into the respective compartments from which they are discharged through the openings 34. The channels are formed by striking up or raising the bottom of the receptacle at one side of the opening 30 in alinement with the recesses provided in the roll, the open ends of the channels facing the roll and being substantially vertical. The channels have perpendicular side walls and an inclined top wall, which is tangential to the roll and overhangs the latter. This construction provides exits from the receptacle for the seed, which, when the recesses in the roll, by the rotatable movement of the latter, come in vertical alinement with the channels, allows the seeds to pass out. That portion of the side of the opening 30 between the channels fits the roll rather closely so that the seeds cannot escape except through the channels. By this means, the seed is prevented from getting between the roll and the housing and clogging the roll, and at the same time exit passages are provided which are tangential to the periphery of the roll and cooperate with the recesses 32 to deliver the seed without crushing. The sides of the cups or recesses 32 have a gradual outward slope, as shown at 35, so that beans which do not go through the channels 33 will slide off without being crushed, and there is no chance for them to wedge or clog. Nipples 36 extend downwardly and forwardly from the openings 34, and may be connected by flexible hose 37 to the corn planter shoes.

It will be particularly noted that the attachment is of simple and inexpensive construction, and yet has a wide range of adaptability, so that it may be attached to any style of corn planter, and only one stock size need be made. The rate of feed may be adjusted by changing the ratio of the gearing, or by changing the roll 28 for one having a greater or less number of recesses 32.

The cooperation between the recesses 32 in the feed roll and the channels 33 will be clear from the following explanation. If the recesses 32 were made deep enough so that some of the beans could pass through, without the overhanging channels 33, some of the beans which projected a little above the recesses would be crushed. If the sides of the recesses were perpendicular to the axis of the roll, some of the beans would get wedged in so that they would not fall out. When the center of the recess is under the mouth of the channel it makes the opening longer, and when the edge of the recess is at the mouth of the channel, the opening is smaller, but still large enough so that a bean may pass through. No matter how deep the recesses might be made, if the channels were not used, some of the beans would be crushed and stick in the opening. It is the action of the recesses in enlarging and diminishing the size of the opening which causes the beans to be fed without crushing or clogging.

While I have shown specifically one adaptation of the invention, it is to be understood that this is merely illustrative, and that modifications may be made in the details of construction and the relative size and arrangement of the various parts thereof without departing from the spirit of the invention as defined in the claims.

What is claimed is:

1. A receptacle with an opening in its bottom, a feed roll fitted into said opening and having a series of circumferential recesses, a housing surrounding the lower part of the roll and having a discharge opening, the opening in the receptacle bottom being raised on one side of the opening in alinement with the recesses to form a restricted exit for seeds carried in the recesses.

2. A receptacle with an opening in its bottom, a feed roll beneath said opening and substantially closing the same and having a series of circumferential recesses, a housing surrounding the lower part of the roll and having a discharge opening, a guiding channel overhanging the roll at one side of the opening in the bottom of the receptacle and formed by a raised portion of said bottom tangential to the roll, said channel being in alinement with the recesses and cooperating therewith to discharge the seed without crushing.

3. A receptacle with an opening in its bottom, a feed roll located beneath said opening and fitting the same, said roll having two spaced series of circumferential recesses, and spaced channels overhanging the roll and formed by raised portions of the receptacle bottom at one side of said opening and tangential to the roll, said raised portions being in alinement with the said recesses and cooperating therewith to discharge the seed without crushing.

4. An attachment for planters, comprising a receptacle provided with an opening in its bottom, a feed roll mounted for rotatable movement beneath said opening, said roll having a series of circumferentially spaced shallow recesses forming cups, which are substantially elliptical in shape and have a gradual outward slope toward the sides, and a guide channel formed at the bottom of the receptacle above the recesses of said roll, said channel having perpendicular side walls and an inclined top wall, said guide channel providing a passageway which cooperates with the recesses in the roll to discharge the seed without crushing.

In testimony, that I claim the foregoing as my own, I have hereto affixed my signature.

LEONARD C. NOTBOHM.